United States Patent
Werz

(10) Patent No.: US 8,336,359 B2
(45) Date of Patent: Dec. 25, 2012

(54) METHOD FOR SELECTIVELY FORMING (PLASTIC WORKING) AT LEAST ONE REGION OF A SHEET METAL LAYER MADE FROM A SHEET OF SPRING STEEL, AND A DEVICE FOR CARRYING OUT THIS METHOD

(75) Inventor: Ulrich Werz, Dettingen (DE)

(73) Assignee: ElringKlinger AG, Dettingen (DE)

( * ) Notice: Subject to any disclaimer, the term of this patent is extended or adjusted under 35 U.S.C. 154(b) by 931 days.

(21) Appl. No.: 12/381,389

(22) Filed: Mar. 10, 2009

(65) Prior Publication Data

US 2009/0235715 A1  Sep. 24, 2009

(30) Foreign Application Priority Data

Mar. 15, 2008  (DE) .......................... 10 2008 014 559

(51) Int. Cl.
*B21D 22/20* (2006.01)
*B23K 13/01* (2006.01)
*H05B 6/40* (2006.01)

(52) U.S. Cl. ..................... 72/342.1; 72/342.5; 72/342.6; 72/342.95; 72/57; 29/421.1; 219/603; 219/633

(58) Field of Classification Search ............... 72/54, 56, 72/342.1, 342.7, 342.8, 342.92, 342.96, 342.5, 72/342.6; 29/421.1; 219/603, 633
See application file for complete search history.

(56) References Cited

U.S. PATENT DOCUMENTS

| | | | |
|---|---|---|---|
| 3,835,282 A | 9/1974 | Sass et al. | 219/10.57 |
| 5,365,041 A * | 11/1994 | Shank | 219/633 |
| 5,442,159 A * | 8/1995 | Shank | 219/633 |
| 6,257,591 B1 | 7/2001 | Abe et al. | 277/591 |
| 6,365,883 B1 | 4/2002 | Pohl | 219/634 |
| 6,927,370 B2 * | 8/2005 | McClure et al. | 219/603 |
| 7,269,986 B2 * | 9/2007 | Pfaffmann et al. | 72/60 |
| 7,574,884 B2 * | 8/2009 | Carsley et al. | 72/57 |
| 2007/0194010 A1 | 8/2007 | Lovens et al. | 219/645 |

FOREIGN PATENT DOCUMENTS

| | | |
|---|---|---|
| DE | 22 04 343 | 8/1973 |
| DE | 199 44 910 A1 | 3/2000 |
| EP | 0 863 335 | 9/1998 |
| EP | 0 863 335 A2 | 9/1998 |
| GB | 1 413 875 | 11/1975 |
| JP | 11-97165 A | 4/1999 |

\* cited by examiner

*Primary Examiner* — David B Jones

(57) ABSTRACT

A method for selectively forming at least one region of a gasket sheet metal layer made of a spring steel, wherein, for the purposes of facilitating the forming process, the region of the sheet metal layer that is to be formed is heated up inductively for reducing the hardness thereof and the electromagnetic alternating field serving for the inductive heating process is concentrated onto the region that is to be formed, wherein the application time of the electromagnetic alternating field on each part of said region of the sheet metal layer that is to be formed amounts to at most approximately 2 seconds.

22 Claims, 12 Drawing Sheets

Figure 1:
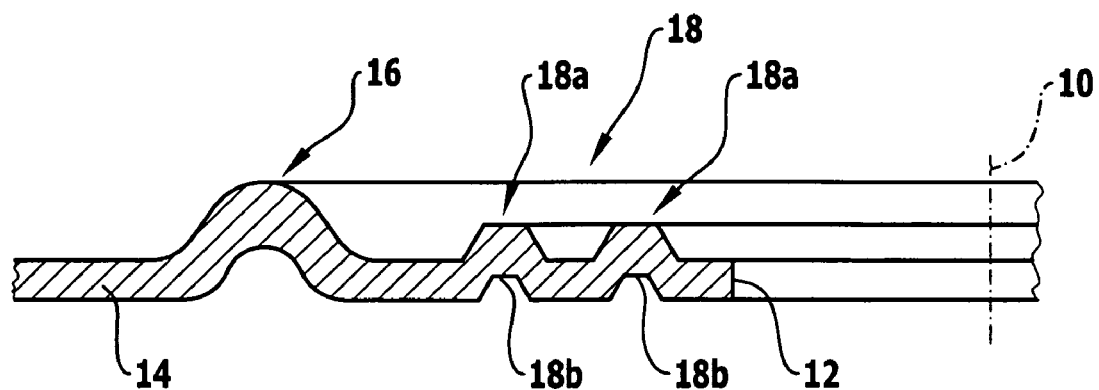

METHOD FOR SELECTIVELY FORMING (PLASTIC WORKING) AT LEAST ONE REGION OF A SHEET METAL LAYER MADE FROM A SHEET OF SPRING STEEL, AND A DEVICE FOR CARRYING OUT THIS METHOD

In general, metallic gaskets and especially gaskets such as cylinder head gaskets, exhaust manifold gaskets and the like which are used in conjunction with internal combustion engines usually have at least one sheet metal layer consisting of a metal sheet of spring steel which not only includes openings serving as through passages for fluids and holes through which mounting bolts can pass, but also springy resilient sealing beads in the form of so called full beads and/or half beads having deformation limiters (referred to as stoppers) associated with said beads, and possibly also further supporting elements which are additional to such stoppers but are not associated with a bead and which serve the purpose of accommodating compressive forces acting upon the gasket when being clamped between sealing surfaces of components of the engine in order to at least minimize distortions in the components of the engine and in particular the sealing surfaces of the engine components. In this connection, it should be mentioned that the total thickness of the sheet metal layer in the region of a stopper or other supporting element is greater than in regions of the sheet metal layer bordering on the supporting element, and that the height of a stopper (the amount by which the stopper projects above these bordering regions of the sheet metal layer) must be somewhat less than the height of the sealing bead in order for the latter to be able "to work" when the engine is in operation, i.e. that the height of the bead can alter reversibly before the stopper is pressed whereafter further flattening of the bead is prevented so that it cannot be destroyed by the dynamic compressive load when the engine is in operation.

In the case of the gaskets under discussion, the stoppers and other supporting elements usually take the following form if one dispenses with the use of an element for the stoppers or supporting elements that is in the form of a separate sheet metal stamping and is fixed to the sheet metal layer by spot welding for example: A boundary region of the sheet metal layer (be it now an outer edge or an edge that is located in the interior of the sheet metal layer) is bent through approximately 180° and folded back onto the sheet metal layer, or such a boundary region is thickened by a plastic deformation of the sheet metal, for example, by an embossing process or by upsetting the sheet metal from the edge of the sheet metal layer. However, such forming processes are difficult or even impossible to carry out on a metal sheet of spring-steel, quite apart from the fact that at least micro-cracks would occur in the sheet at the positions of small bending radii when performing the above mentioned crimping processes at a boundary region of a sheet metal layer of spring-steel, and such cracks would then lead to destruction of the gasket when the engine is in operation.

In EP-A-0 863 335, there is described, in particular, a single layer metallic gasket such as a cylinder head gasket wherein a sealing element, which is in the form of a bead or a crimped over (doubled back) boundary region of the sheet metal layer, is produced around an opening that is to be sealed in a sheet metal layer made from a sheet of spring steel. In order to prevent cracks developing therein during the forming or plastic working of the sheet metal layer that is necessary for producing the sealing element, the sheet metal layer is heat treated in that region thereof which will subsequently form the sealing element in order to produce a change in the microstructure with consequential softening of the spring-steel sheet metal in this region and, after the supporting element has been produced, it is given a subsequent thermal treatment in order to impart the desired hardness thereto. In EP-A-0 863 335, mention is made of an inductive heating process, and also of heating processes by means of a laser, microwaves or electron beams which are utilised for the thermal treatment used for reducing the hardness of the metal sheet of spring steel.

A sheet metal layer of a gasket is only made from a relatively expensive spring-steel sheet metal, if the sheet metal layer comprises elements which have function-requisite springy resilient properties. If such an element with springy resilient properties is located in the proximity of a supporting element produced by a process of forming (plastic working) the sheet metal layer, a reduction in the hardness of the sheet metal layer brought about by a thermal treatment prior to the forming process will lead to an impairment in the springy resilient properties of, for example, a sealing bead located in the neighbourhood of the supporting element that is to be produced by forming the sheet metal layer. This problem does of course not arise if the thermal treatment of the sheet metal layer is accomplished by means of a laser or by electron beams since the latter can be focused, just like a laser beam, onto a narrowly bounded area; however, these methods of thermal treatment necessitate relatively long cycle times in the production process since, for example, for the purposes of producing a stopper surrounding a fluid opening in the gasket which requires sealing, the laser beam or the electron beam must be guided around the fluid opening. Moreover, in the case of relatively long cycle times, there is a danger that as a consequence of the heat conductivity of the spring-steel sheet metal, the hardness and hence too the springy resilient properties of the areas neighbouring the region of the sheet metal layer that is to be formed will be impaired before heat is sufficiently extracted from the sheet metal layer by a forming tool.

Here now is where the present invention begins, the object of which was to adequately heat up a region of a sheet metal layer, which requires heating for the purposes of producing a supporting element that is to be obtained by a process of forming (plastic working) the sheet metal layer, by means of a relatively simple and therefore economical means of production in such a way that the amount of energy necessary for the heating process is concentrated onto a narrowly defined region of the sheet metal layer whilst areas neighbouring this region are not also softened.

For the purposes of achieving this object, the invention commences from a method for selectively forming (plastic working) at least one region of a gasket sheet metal layer made of a spring steel which is to be provided with at least one supporting element that is produced by forming the sheet metal layer in said at least one region thereof, wherein compressive forces act upon said supporting element when the gasket is clamped between sealing surfaces of components of a machine and wherein the total thickness of the sheet metal layer in the region of said supporting element is greater than in regions of the sheet metal layer bordering directly on said supporting element, wherein the hardness of the sheet metal layer is decreased in said region (to be formed) by inductive heating prior to the forming process.

In accordance with the invention, it is proposed that, in order to decrease the hardness of the sheet metal layer exclusively within the region that is to be formed, such a method be carried out such that (a) an alternating electromagnetic field for effecting the inductive heating is concentrated on the region that is to be formed and
(b) the application time of the electromagnetic alternating field on the sheet metal layer amounts to at most approximately 2 seconds.

Heat energy having a power of some ten thousand W/cm$^2$ can be introduced into a metal sheet of spring steel by means of an inductor (an electrical conductor through which there is a flow of electrical alternating current); since, however, the electromagnetic alternating field generated by the inductor surrounds the inductor in circular ring-like manner (in cross section) unless additional measures are taken, there is a need for a magnetic field concentrator so as to narrowly delimit the region of the sheet metal layer that is to be heated up inductively, said concentrator being a jacket or cladding of a material of relatively high permeability which surrounds the inductor and comprises an opening that may be in the form of a window-like opening which is closed by a material of relatively low permeability, and that is located at the point whereat the electromagnetic alternating field emerges from the unit consisting of the inductor and the magnetic field concentrator and whereat it is intended to be effective on the region of the sheet metal layer that is to be softened. Units consisting of an inductor and a magnetic field concentrator of this type are known from the state of the art, for example, from the brochure "Werkstoffbroschüre Ferrotron® and Fluxtrol®" issued by the company POLYTRON Kunststofftechnik GmbH & Co. KG, 51469 Bergisch-Gladbach, Germany.

Such a magnetic field concentrator preferably consists of a material which exhibits both ferromagnetic and dielectric properties and consists substantially of uniformly distributed soft iron particles that are embedded in a thermoplastic heavy duty synthetic material.

The method in accordance with the invention is preferably used for starting materials in the form of spring steels having a yield strength ($R_e$) of at least 1000 N/mm$^2$ since otherwise, the forming of regions of such metal sheets of spring steel into so-called stoppers or other supporting elements in the sheet metal layer of a gasket is highly problematical.

For the purposes of carrying out the method in accordance with the invention, a spring-steel metal sheet consisting of an austenitic spring steel is particularly suitable since a martensitic carbon steel for example must be rapidly cooled down after the heating process.

Since, as previously mentioned, heat energy with a power of some ten thousand W/cm$^2$ can be introduced into a metal sheet of spring steel by means of an inductive heating process, the method in accordance with the invention permits a region of the sheet metal layer which is to be formed to be heated up to 700° C. or more within a shortest period of time, and preferably, the region that is to be formed is heated up to a temperature of approximately 700° C. to approximately 900° C. using the method in accordance with the invention. In this connection, it should be mentioned that in the case of a metal sheet of spring steel, a region, which is relatively close to the region that is to be heated up and formed but which should not itself lose its springy resilient properties because a sealing bead or a region of the sheet metal layer having springy resilient properties containing some other type of deformation is located therein for example, may be heated up to approximately 500° C. without incurring a reduction in the strength and hence springy resilient properties of the steel.

If, in carrying out the method in accordance with the invention, the region of the sheet metal layer of spring steel that is to be formed is not heated up to a temperature of over approximately 900° C., then recrystallisation will not occur in the steel—if recrystallisation were to occur, then irreversible corrugations would be produced therein in the course of the process of heating up the sheet metal layer, this being something that should be avoided in the case of a sheet metal layer for a gasket.

The invention is thus concerned, in particular, with a method for the production of a sheet metal layer which has, in the immediate neighbourhood of the supporting element, a region of the sheet metal layer that is provided with a deformation and possesses springy resilient properties even without any subsequent thermal treatment, wherein the method is characterised in that the inductive heating of the region of the sheet metal layer that is to be provided with the supporting element is selected regarding the application time, the concentration and the energy of the electromagnetic alternating field such that there will be at least no significant change in the micro-structure and hence no change in the strength of the steel within the region of the sheet metal layer that is provided with or is to be provided with the deformation. In particular, the invention relates to a method wherein the deformation is a springy resilient sealing bead for which the supporting element forms a deformation limiter (stopper).

Because of the high power of a unit consisting of an inductor and a magnetic field concentrator, an application time of the electromagnetic alternating field varying from some milliseconds up to at most approximately 1 second on each part of the region of the sheet metal layer that is to be formed is sufficient for most of the sheet metal layers of spring-steel used for gaskets because of the low thickness of the metal sheet.

Since the hardness of the region of the sheet metal layer that is to be formed should be decreased to an adequate extent throughout the total thickness of the sheet metal layer and the depth of penetration of an electromagnetic alternating field (into the sheet metal layer) depends on the frequency of the electromagnetic alternating field, this frequency should not be all too high, but so too, should it not to be too low, so that the electromagnetic alternating field will generate eddy currents of adequate strength in the sheet metal layer, said eddy currents being responsible for the heating of the metal sheet. The recommendation for the method in accordance with the invention is therefore that use should be made of an electromagnetic alternating field having a frequency of some hundreds of kHz up to approximately 1 MHz and in particular, a frequency in the order of magnitude of 200 to 500 kHz.

If, after being heated, the region of the sheet metal layer that is to be formed is cooled very slowly then the forming characteristics of the metal sheet can be impaired due to embrittlement of the steel; if, however, the method in accordance with the invention is carried out in such a way that the heated region of the sheet metal layer is sufficiently cooled down within a time period of from approximately 1 second to approximately 1 minute then such embrittlement will be prevented, and, when carrying out the method in accordance with the invention, sufficiently short cooling times can easily be obtained, namely, due to the cooling effect of the ambient air and due to thermal conduction, above all, if a material-forming tool acts on the region of the metal sheet that is to be formed immediately after the heating thereof.

In preferred embodiments of the method in accordance with the invention, the sheet metal layer is clamped or pretensioned at least in the region thereof that is to be heated up and simultaneously or subsequently formed in order to prevent the spacing of the sheet metal layer from the inductor from changing as a consequence of the thermal expansion of the steel in the course of the heating process—in the event of a change in this spacing, the production of the eddy currents responsible for the heating would also change, and the consequence of such a change would be that bulges and/or folds would be produced in the metal sheet. For the purposes of effecting such a clamping action or for the production of such a pre-tensioning, the sheet metal layer can be clamped between clamping surfaces during the heating process at least in that region thereof that is to be subsequently formed and/or the sheet metal layer can be subjected to a tensile stress effective approximately in the plane of the sheet metal layer—in the last mentioned case and if so desired, the thickness of the sheet metal layer can also be decreased within the heated region in the course of the heating process, this, for example, being desirable in the case where the region of the sheet metal layer that is to be formed is formed into a stopper by a flanging or crimping process and the total thickness thereof should be less than double the thickness of the starting material used for the production of the sheet metal layer.

As has already been referred to hereinabove, the region of the sheet metal layer that is to be formed can be subjected to a forming process in the course of the heating process itself, in particular, in a manner such that the at least one inductor together with the magnetic field concentrating device associated with the latter is also designed as a material-forming tool or is combined with such a device so as to form a single modular unit.

As is apparent from the foregoing, the invention also relates to a device for carrying out the method in accordance with the invention, said device comprising at least one electrical conductor in the form of an inductor that is connectable to an a.c. source for the purposes of inductively heating the region of the sheet metal layer that is to be formed and being characterized by a magnetic field concentrating device or magnetic field shielding device which partially surrounds the inductor and forms an induction unit together with the inductor and which also comprises an opening to face the region of the sheet metal layer that is to be formed and in the region whereof, the magnetic field concentrating device is permeable to the electromagnetic alternating field.

In order to enable that region of the sheet metal layer from which a supporting element is then produced by means of a forming process to be simultaneously heated up in its entirety in an "abrupt" manner, it is proposed in one preferred embodiment of the device in accordance with the invention that the shape of the induction unit be matched to the shape of the region of the sheet metal layer that is to be formed—thus, for example, if a ring-like stopper is to be produced, the induction unit has the shape of a ring.

In principle however, the device in accordance with the invention can also be designed in such a way that the induction unit and the sheet metal layer are movable relative to each other during the process of heating the latter in a manner such that the region of the sheet metal layer that is to be formed can be passed over by the induction unit so that mutually neighbouring sections of the region of the sheet metal layer that is to be formed are successively heated by means of such an induction unit. Particularly for this case there is a recommendable embodiment of the device in accordance with the invention wherein the induction unit is also designed as a material-forming tool or is combined with a material-forming tool such as to form a single modular unit therewith so that the forming process can be accomplished in the course of heating the region of the sheet metal layer that is to be formed or, immediately after the heating process; it is then particularly expedient if the sheet metal layer is kept stationary for the heating and forming processes and if the aforementioned modular unit is moved over the region that is to be formed or over the regions of the sheet metal layer that are to be formed in order to enable the heating and forming processes to be carried out continuously in one step.

Particularly advantageous embodiments of the device in accordance with the invention are those wherein the openings in the magnetic field concentrating devices of a plurality of, and in particular two, induction units are located opposite one another in such a way that the sheet metal layer that is to be treated is adapted to be placed between these openings, because the electromagnetic alternating field will then be concentrated to a still greater extent on that region of the sheet metal layer which is to be heated up.

If at least that region of the sheet metal layer which is to be heated up and then formed is to be clamped by means of a device in accordance with the invention, then the device comprises at least one pressure pad for the sheet metal layer.

In order to prevent the spacing of the sheet metal layer from the induction unit from changing in the course of the process of heating the sheet metal layer, the device may comprise a spacer plate of low permeability between the induction unit and the sheet metal layer.

Finally, the subject matter of the present invention also includes a sheet metal layer for a gasket which has been manufactured using the method in accordance with the invention and has at least one springy resilient element and also at least one supporting element that was manufactured by locally heating and forming the sheet metal layer, wherein the (micro-) structure of the steel in the region of the supporting element differs from that in the region of the springy resilient element.

Figure 2:
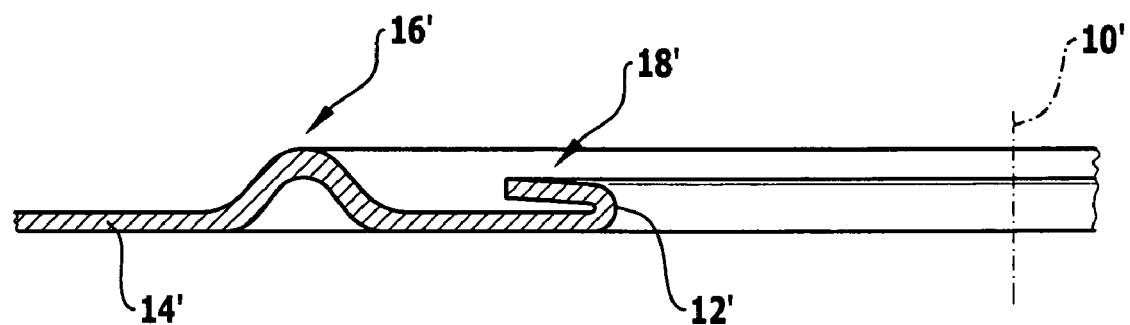
Figure 3:
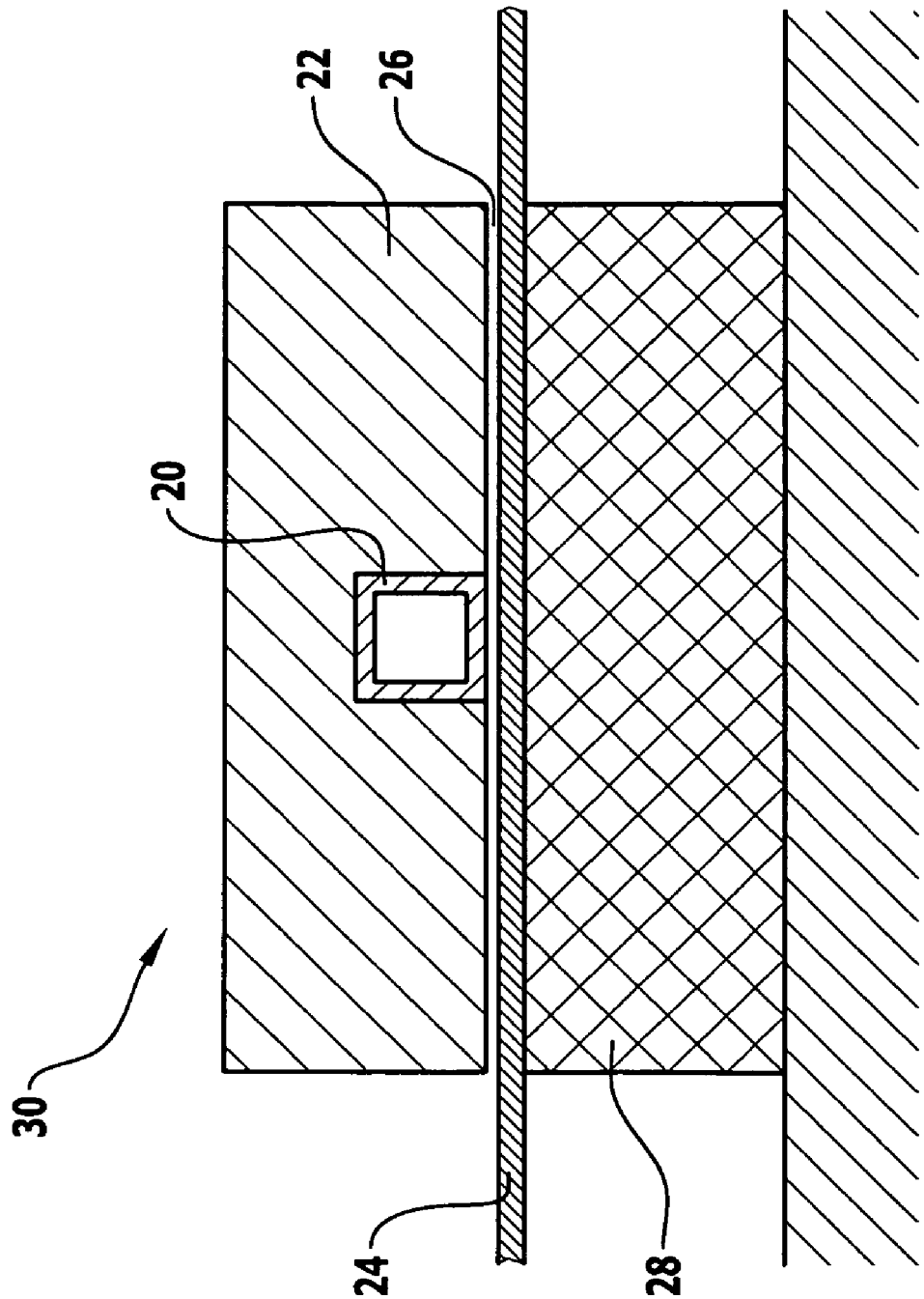
Figure 4:
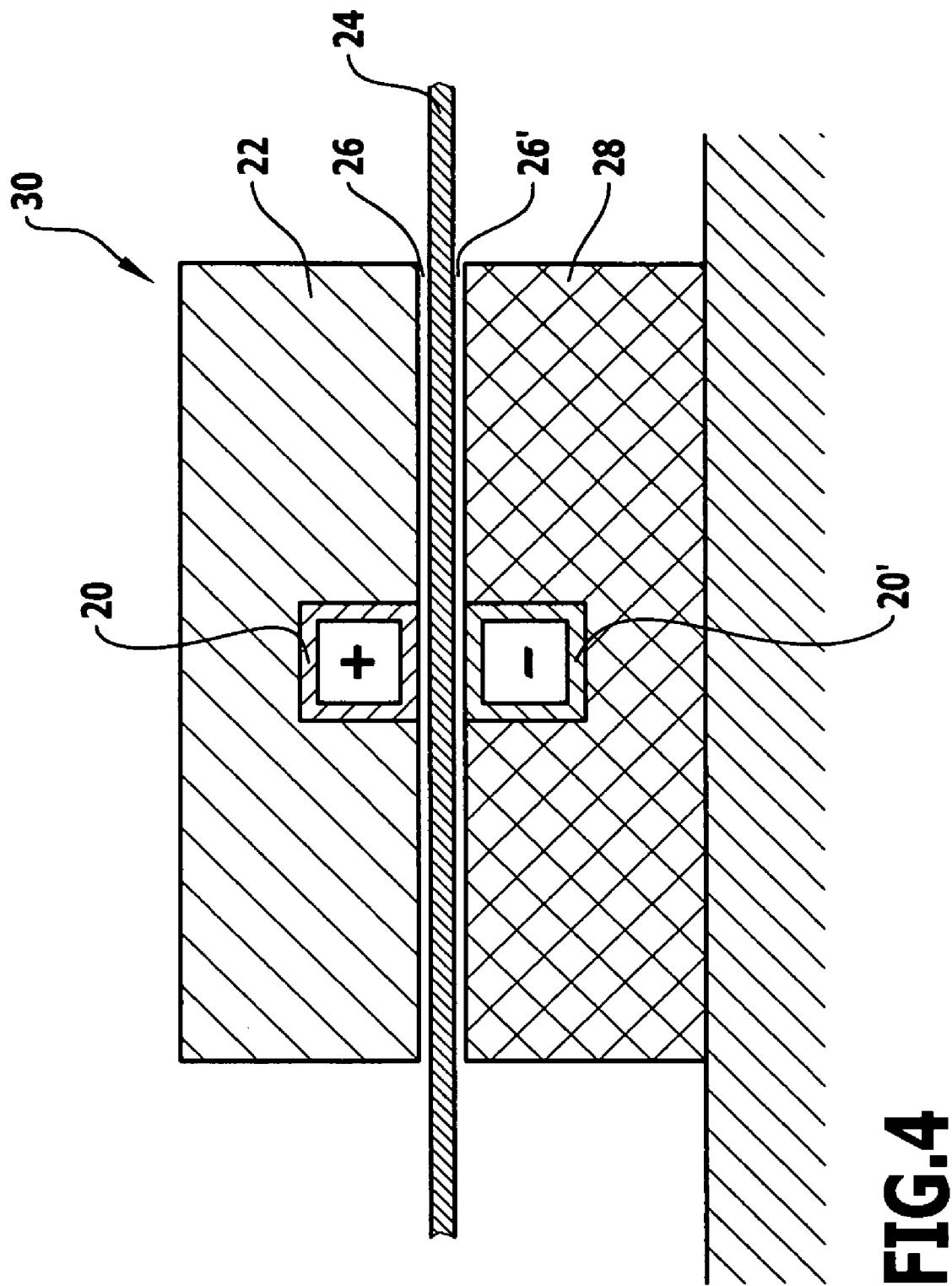
Figure 5:
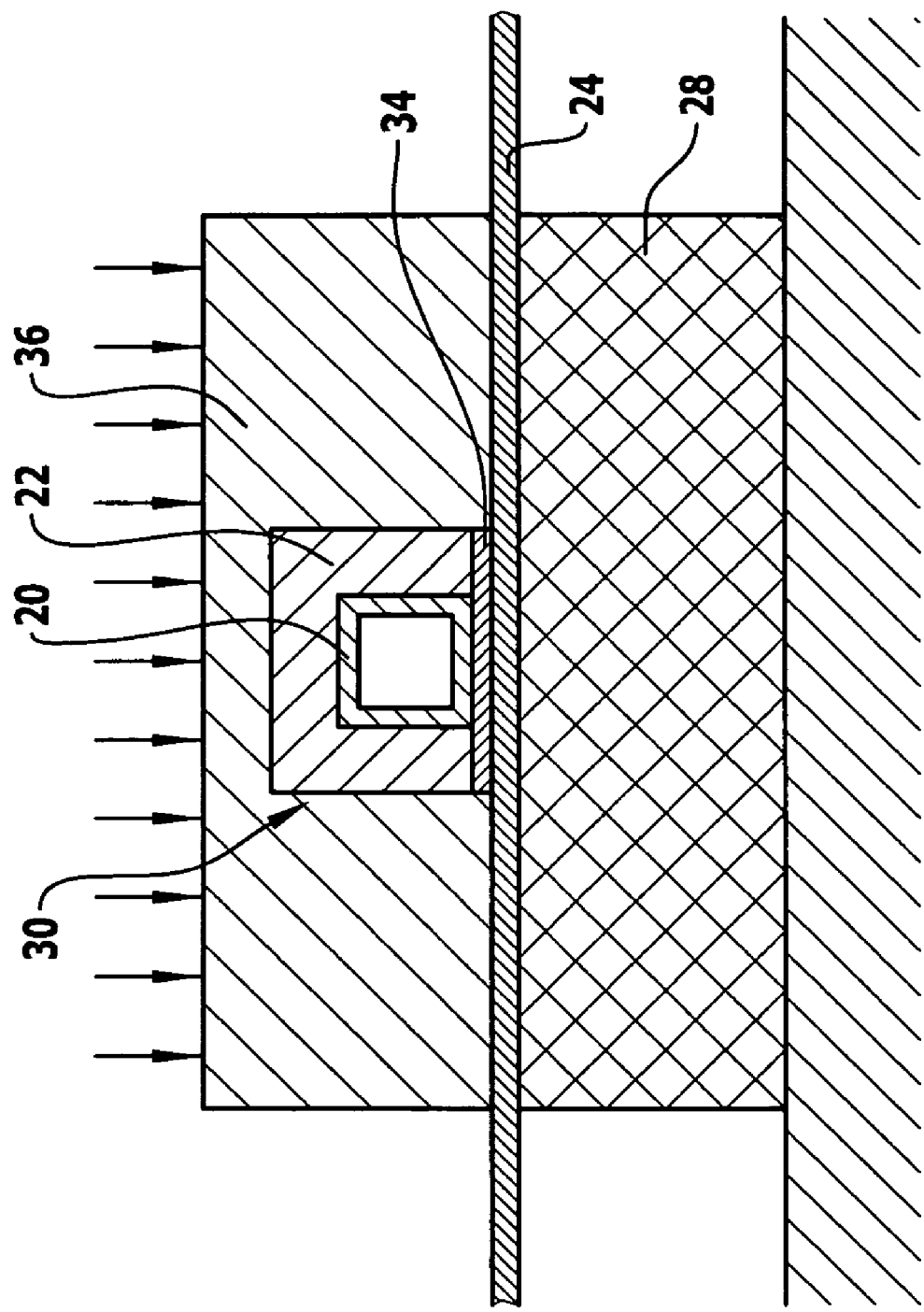
Figure 6:
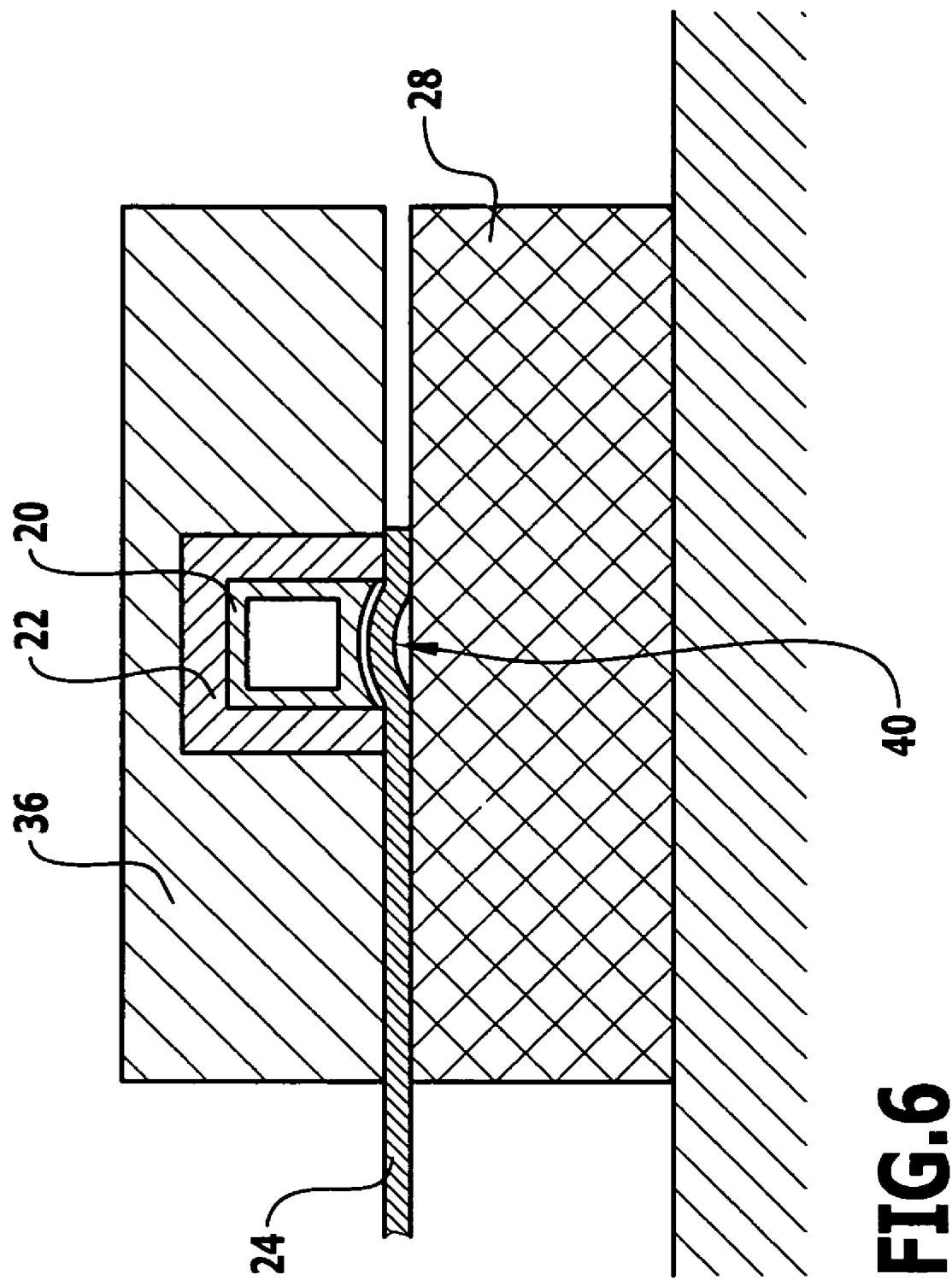
Figure 8:
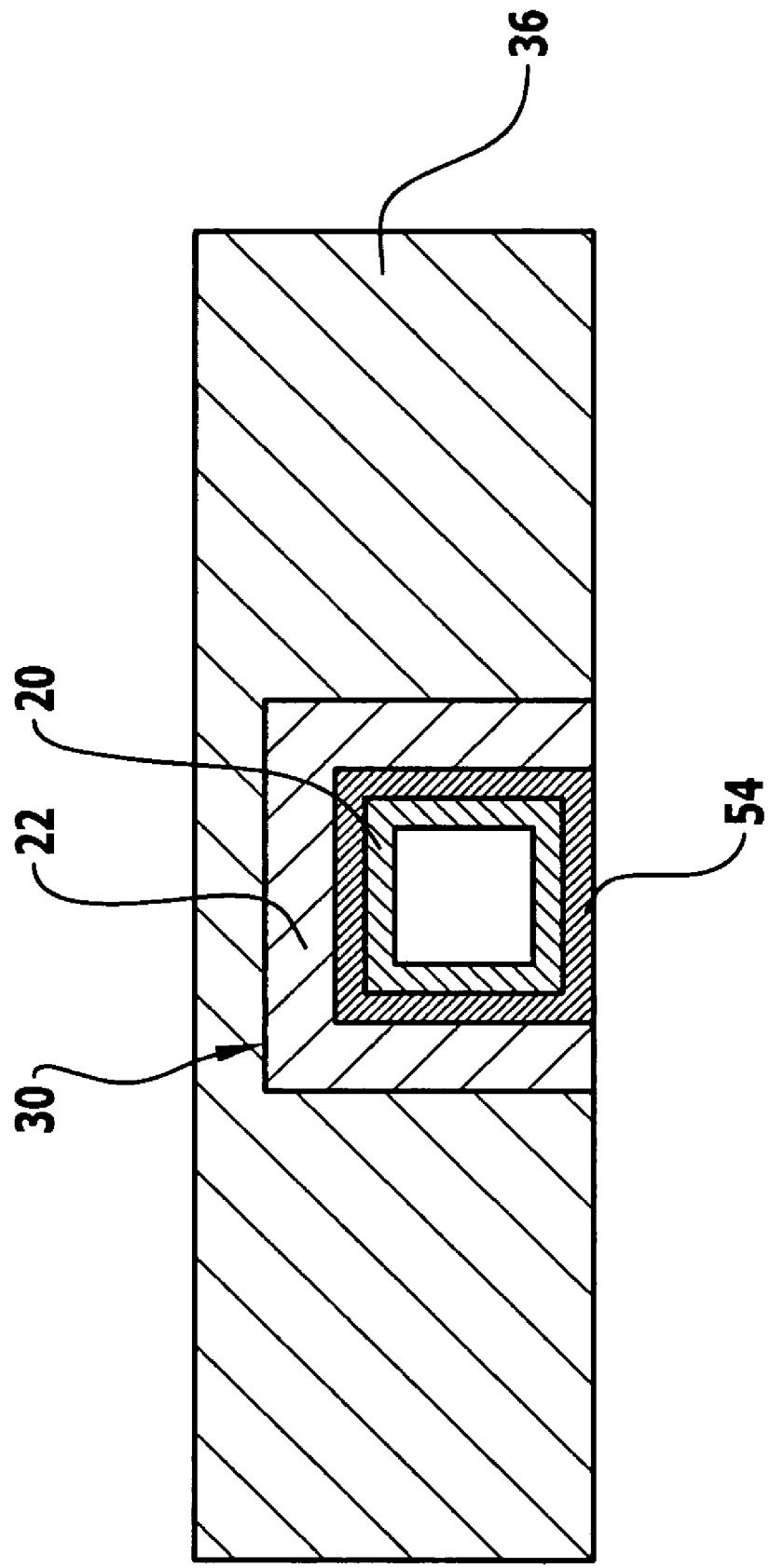
Figure 9:
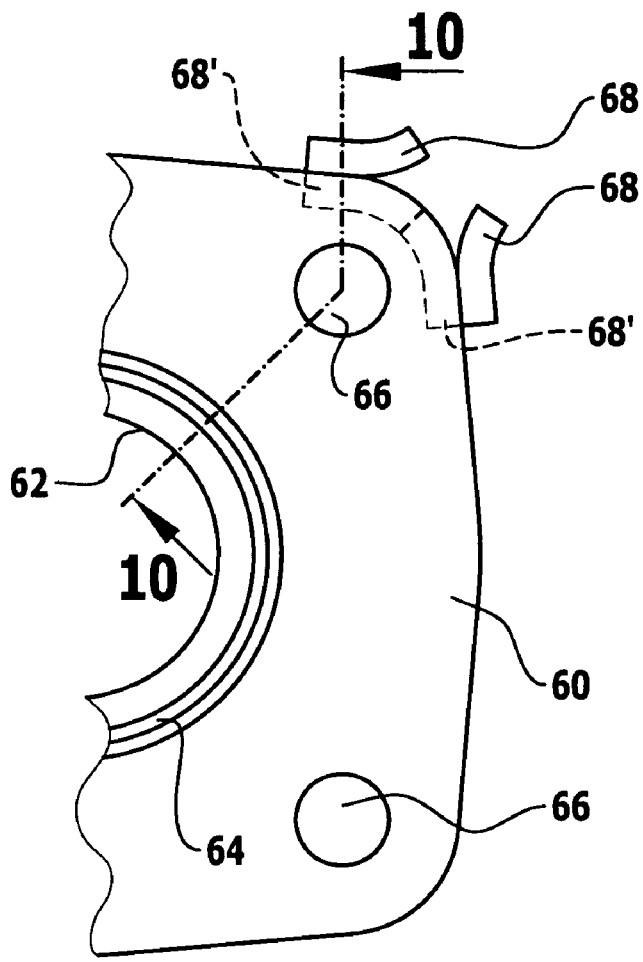
Figure 10:
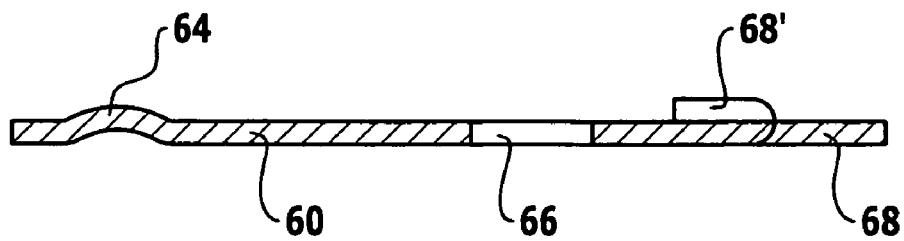
Figure 11:
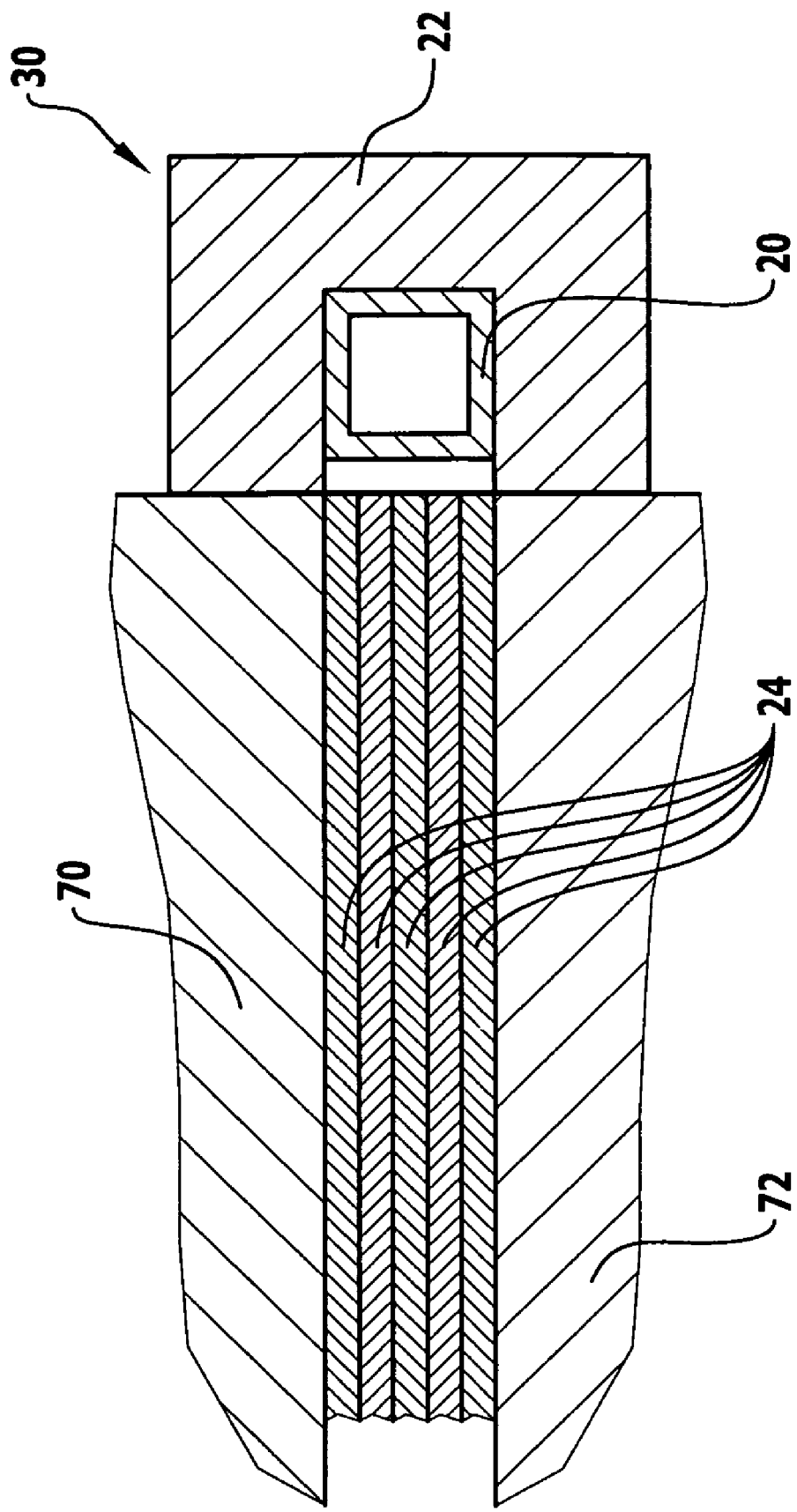
Figure 12:
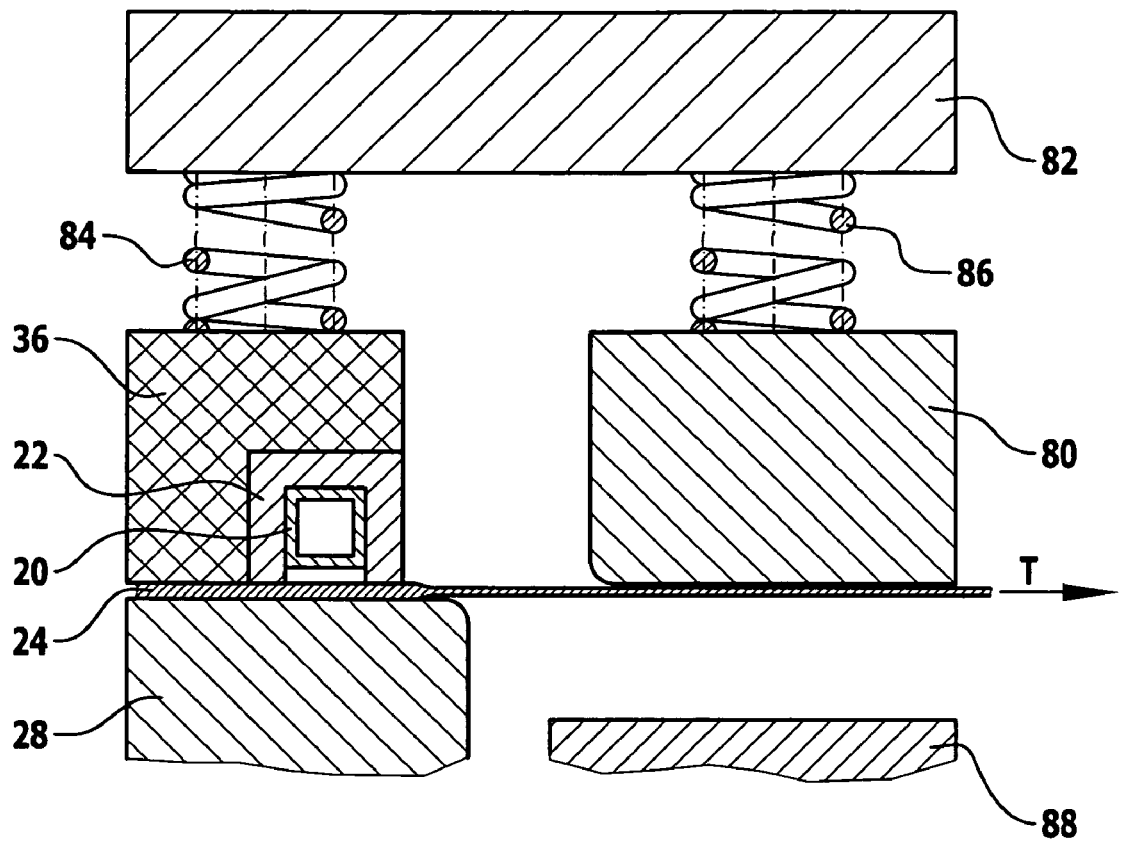
Figure 13:
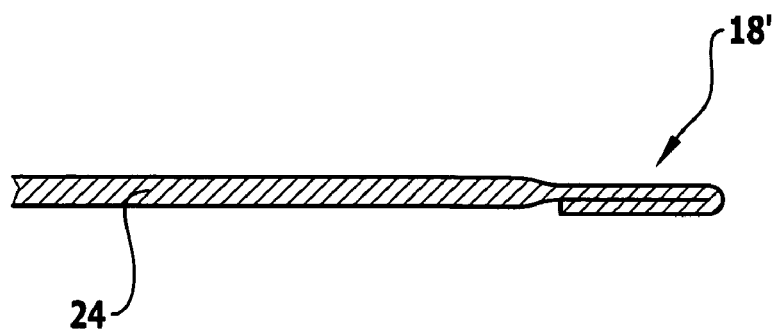
Figure 14:
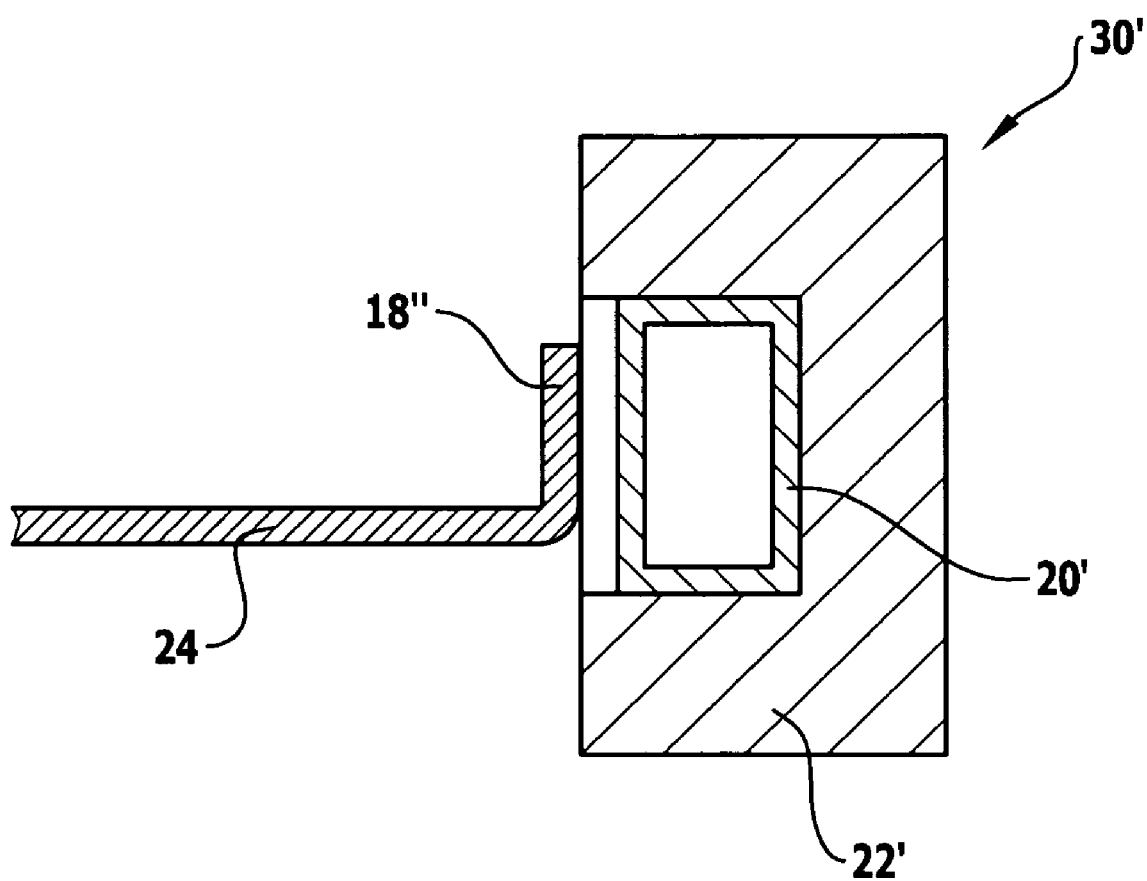
Figure 15:
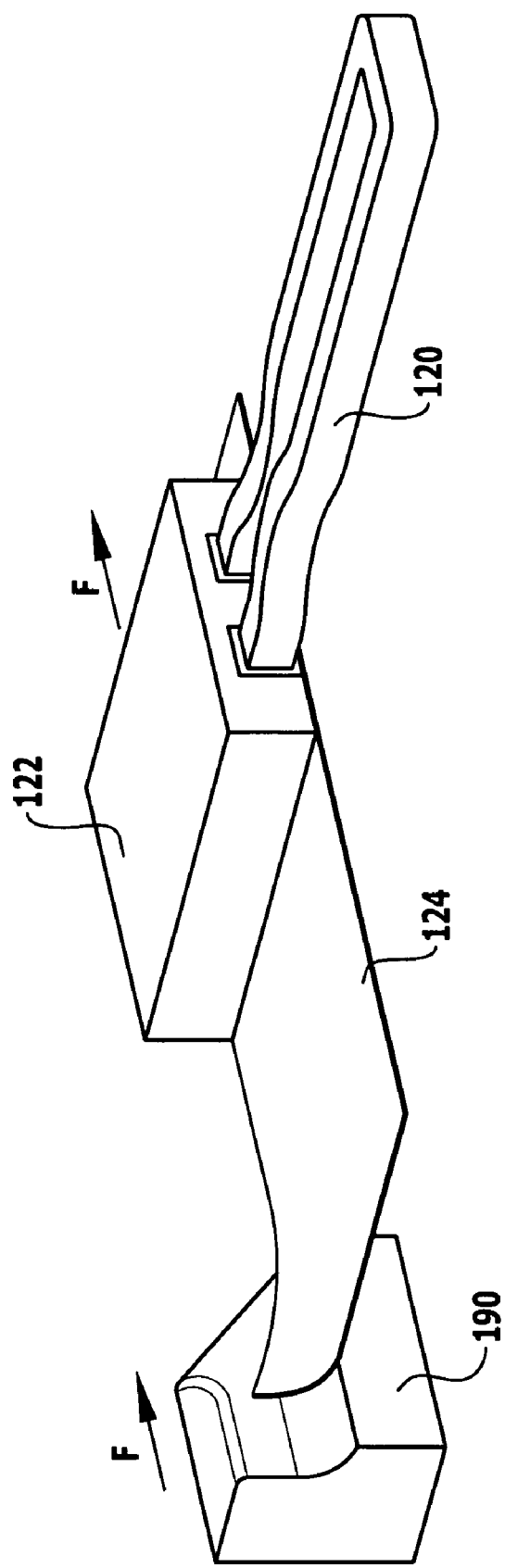

Further features, advantages and details of the invention will become apparent from the following description and the accompanying graphical illustration of some preferred embodiments of the invention; In the drawing:

FIG. 1 shows a section through a part of a sheet metal layer of a gasket manufactured in accordance with the invention, wherein the depicted sheet metal layer part is intended to border an opening in the gasket that is to be sealed, and comprises a sealing bead surrounding this opening and also a supporting element which is effective as a deformation limiter (stopper) and is associated with said bead;

FIG. 2 a section corresponding to FIG. 1 through another embodiment comprising a stopper for the sealing bead which is modified with respect to the embodiment in accordance with FIG. 1;

FIG. 3 a section through a first embodiment of a device in accordance with the invention together with a sheet metal layer that is to be treated therewith;

FIG. 4 a section corresponding to FIG. 3 through a second embodiment of the device in accordance with the invention;

FIG. 5 a section corresponding to FIG. 3 through a third embodiment of the device in accordance with the invention;

FIG. 6 a section corresponding to FIG. 3 through a fourth embodiment of the device in accordance with the invention and of a sheet metal layer that is to be treated therewith, this layer having been pre-deformed for reasons still to be described in the following;

FIGS. 7A to 7D sectional illustrations depicting the sequential steps of an embodiment of the method in accordance with the invention and also the units of a device in accordance with the invention employed for this method;

FIG. 8 a section through a part of a further embodiment of the device in accordance with the invention;

FIG. 9 a plan view of a part of a sheet metal layer before carrying out the method in accordance with the invention;

FIG. 10 a section along the line 10-10 in FIG. 9 after carrying out the method in accordance with the invention;

FIG. 11 a section through a further embodiment of the device in accordance with the invention;

FIG. 12 a section through a further embodiment of the device in accordance with the invention;

FIG. 13 a section through a part of a sheet metal layer of a gasket manufactured in accordance with the invention with the help of the device in accordance with FIG. 12;

FIG. 14 a section through a part of a further embodiment of the device in accordance with the invention together with a part of the sheet metal layer that is to be treated with this device, and FIG. 15 an isometric illustration of a further embodiment of the device in accordance with the invention containing a material-forming tool together with a part of the sheet metal layer that is to be heated up and formed with the help of this device.

The part of a sheet metal layer in accordance with the invention of a gasket illustrated in FIG. 1 is typical of a single or multi-layer metallic cylinder head gasket, and FIG. 1 shows an axis 10 of a combustion chamber opening 12 which has been punched out from a sheet metal layer 14 of the cylinder head gasket. The sheet metal layer 14 has a sealing bead 16 which is in the form of a so-called full bead and surrounds the combustion chamber opening 12 in circular ring-like manner and which, because the sheet metal layer 14 was manufactured from a metal sheet of spring steel, has springy resilient properties and can flatten itself in reversible manner, i.e. the height thereof can decrease when the cylinder head gasket is clamped between a cylinder head and an engine block, whereby, owing to its springy resilient properties, the height of the sealing bead 16 can adapt to the periodically varying width or breadth of the so-called sealing gap that is to be sealed by the cylinder head gasket when the engine is operational and which is defined by not illustrated sealing surfaces of the cylinder head and the engine block. In order to prevent excessive flattening of the sealing bead 16 which would lead to the destruction thereof due to the formation of cracks as a result of the dynamic loads on the sealing bead 16 especially when the engine is operational, there is associated with the sealing bead 16 a stopper bearing the general reference 18 which likewise surrounds the combustion chamber opening 12 in circular ring-like manner and was produced by a forming process (plastic working), namely, by embossing the sheet metal layer 14. The embodiment of the stopper 18 illustrated in FIG. 1 has elevated portions 18a and corresponding depressions 18b which can surround the combustion chamber opening 12 in circular ring-like manner, but it could also be designed in such a way that the elevated portions 18a form a chessboard-like pattern of discrete pimple-like elevated portions 18a when looking down on the sheet metal layer 14 for example and the depressions 18b form a corresponding pattern of discrete depressions 18b when viewing the sheet metal layer 14 from below. In order to enable the stopper 18 to be manufactured by an embossing process, the sheet metal layer 14 was, in accordance with the invention, heat treated prior to the forming process in a region of the sheet metal layer 14 in which the stopper 18 would be produced after the forming process and which surrounds the combustion chamber opening 12 in a circular ring-like manner, namely, it was heat treated in such a manner that the springy resilient properties of the sealing bead 16 would not be impaired by the localised, short-lasting process of heating the sheet metal layer 14.

The embodiment of a sheet metal layer 14' in accordance with the invention which is illustrated in FIG. 2 also has a sealing bead 16' and a stopper 18' and both of them surround a combustion chamber opening 12' in circular ring-like manner and are concentric to the axis 10' of the combustion chamber opening. In this embodiment however, the stopper 18' was produced by bending over an initially flat boundary region of the sheet metal layer 14' extending around the axis 10' of the combustion chamber opening, i.e. the sheet metal layer 14' was folded back upon itself in this boundary region after a circular ring-like portion of the sheet metal layer 14' in which the bending radius of the sheet metal layer or the stopper 18' would be located after the stopper 18' has been produced has, in accordance with the invention, been heat treated in order to enable the sheet metal layer 14' to be crimped over without fracturing. In dependence on the radial width of the stopper 18', it may also be necessary, in accordance with the invention, to additionally heat treat the sheet metal layer 14' in that region thereof forming the upper half of the stopper 18' depicted in FIG. 2 because otherwise cracks oriented approximately radially to the axis 10' of the combustion chamber opening 12' could develop in the radially outer edge region of the upper half of the stopper 18' during the process of crimping over the sheet metal layer.

As is self-evident for a stopper, the height of each of the stoppers 18 and 18' is somewhat less than that of the respective sealing bead 16 and 16' in the unstressed state, i.e. whilst the gasket has still not been inserted into position, so that said bead can be somewhat flattened in springy resilient manner after the gasket has been installed and is operational but before the respectively associated stopper 18 or 18' comes into play, i.e. before it absorbs the compressive forces effective on the respective sheet metal layer 14 and 14' around the respective combustion chamber opening 12 and 12' and prevents further flattening of the sealing bead. In order to enable a stopper to be effective as a deformation limiter, it must be so hard that it will not deform (neither elastically nor ductilely) to at least any significant extent under the effect of the compressive forces ensuing when the gasket is installed and operational, i.e. it maintains its original height to at least a substantial extent.

In the case of a cylinder head gasket above all, it may also be necessary to provide supporting elements which are designed to be the same as or similar to the stopper 18 or the stopper 18' in positions other than around the combustion chamber opening or some other fluid opening, for example, at the periphery of the sealing plate of a cylinder head gasket, such as especially at the narrow sides of a cylinder head gasket intended for a multi-cylinder engine, namely for the purpose of minimizing distortions of the engine components, i.e. the cylinder head and the engine block, and in particular, the cylinder head—such distortions of a component in the case of a multi-cylinder engine are caused, as a result of the distribution of the cylinder head bolts around the engine components, by the fact that the compressive forces produced by the cylinder head bolts and effective on the cylinder head gasket in the regions of the two longitudinal ends of a cylinder head gasket for a multi-cylinder engine are higher than they are in other regions; however, locally differing component rigidities of the engine block and the cylinder head can likewise lead to such locally different compressive forces so that surface distortions of the components that would otherwise be caused by such differences in the compressive forces should be minimized by the envisaged supporting elements on the cylinder head gasket.

The embodiment of a device in accordance with the invention shown in FIG. 3 has a merely schematically illustrated inductor 20, which, in the event that a ring-like supporting element is to be produced by a process of forming a sheet metal layer of spring steel, is matched to the shape of the sheet metal layer region that is to be formed and likewise has a ring-like shape when viewed from above in accordance with FIG. 3. The inductor 20 can, for example, be a ring-like metallic (electrical) conductor, but it could also be a ring-like coil for generating an electromagnetic alternating field. The inductor 20 is inserted into a magnetic field concentrator 22 which consists of a material of high permeability, and in particular, a material with ferromagnetic properties. The concentrator 22 surrounds the inductor 20 from above and on both sides, but not however from below (in accordance with FIG. 3) so that the electromagnetic alternating field generated by the inductor 20 can be effective on a sheet metal layer 24 and produce therein the eddy currents that serve to cause the local heating of the sheet metal layer. In the embodiment illustrated in FIG. 3 and as a consequence of the concentrator 22, the electromagnetic alternating field effective on the sheet metal layer 24 is concentrated on and restricted to that region of the sheet metal layer 24 which is located under (in accordance with FIG. 3) the inductor 20. In the embodiment illustrated in FIG. 3, an air gap 26 is provided between the inductor 20 and the sheet metal layer 24 so that the sheet metal layer does not come into contact with the inductor 20. Finally, in this embodiment of the device in accordance with the invention, there is provided a table-like support means 28 for the sheet metal layer 24, this advantageously being a unit consisting of a material such as ceramic which is not affected by the electromagnetic alternating field generated by the induction unit in the form of the inductor 20 and the concentrator 22 and which, moreover, exhibits as small a heat conductivity as possible so that the region of the sheet metal layer 24 that is to be heated up by the induction unit 30 is not cooled by the support means 28.

The embodiment of the device in accordance with the invention illustrated in FIG. 4 differs from that in accordance with FIG. 3 only by the fact that it comprises a second inductor, for which reason the same reference symbols as those in FIG. 3 have been used in FIG. 4 apart from the reference symbol for the second inductor. This second inductor 20' is located opposite the other inductor 20 and is embedded in the support means 28 that is implemented in the form of a ceramic plate. In correspondence with the air gap 26 of the embodiment in accordance with FIG. 3, an air gap 26' is also provided between the second inductor 20' and the sheet metal layer 24 in the embodiment in accordance with FIG. 4 so that the latter cannot come into contact with the second inductor 20'—self-evidently therefore, the sheet metal layer 24 must be held by not illustrated means in such a way that the air gap 26' ensues. In FIG. 4, an indication is given that in every moment the momentary direction of the current of the electrical alternating current flowing in one respective inductor is opposite to the direction of the current in the respective other inductor by means of a mathematical plus sign in the inductor 20 and by a mathematical minus sign in the inductor 20'; in this case, it is not necessary to provide a second concentrator for the second inductor 20' in order to concentrate the electromagnetic alternating field generated by the two inductors 20, 20' onto that region of the sheet metal layer 24 which is located directly underneath the inductor 20, but if, however, the second inductor 20' is surrounded by a second concentrator up to the end thereof facing the sheet metal layer 24, then there will be a still greater concentration of the electromagnetic alternating field on that region of the sheet metal layer 24 that is to be heated. In a preferred modification of the inventive method, two inductors disposed opposite to one another are provided, a sheet metal layer to be processed is located between said inductors, and in every moment the momentary direction of the current in an inductor region of a first one of the inductors, which inductor region is disposed adjacent the sheet metal layer, is the same as the momentary direction of the current in an inductor region of the other inductor, which inductor region is also located adjacent the sheet metal layer. This seems to be advantageous with regard to an improved and more uniform heating of the sheet metal.

From FIG. 4, it can also be perceived that in order to maintain a spacing between the sheet metal layer 24 and an inductor, it can be useful to provide the device in accordance with the invention with a spacer between the inductor and the sheet metal layer 24, whereby this spacer must naturally consist of a material which is electrically non conductive on the one hand and is permeable to the electromagnetic alternating field on the other, i.e. it exhibits a very low permeability.

The further embodiment of the device in accordance with the invention illustrated in FIG. 5 is, to a large extent, identical with the embodiment illustrated in FIG. 3, which is why that in so far as possible the same reference symbols as those in FIG. 3 have been used in FIG. 5 and only those features of the embodiment illustrated in FIG. 5 by which the two embodiments differ are described in the following.

The embodiment in accordance with FIG. 5 comprises an intermediate plate 34 serving as a spacer between the inductor 20 and the concentrator 22 which is of smaller construction than that in the embodiment in accordance with FIG. 3, said plate consisting of an electrically insulating material which is however permeable to the electromagnetic alternating field, this thereby ensuring that the sheet metal layer 24 cannot come into contact with the inductor 20 above all in the course of the heating thereof. The inductor 20 and the concentrator 22 are inserted into a punch-like pressure pad 36 for example which, as has been indicated by the arrows in accordance with FIG. 5, can be pressed downwardly (by not illustrated means) against the sheet metal layer 24 seated upon the support means 28 whereby its lower surface, which serves as a pressure pad surface, is flush with the lower surface of the intermediate plate 34.

In analogous manner to the embodiment in accordance with FIG. 5, the embodiment in accordance with FIG. 4 can also be provided with intermediate plates which fill out the air gaps 26 and 26' at least in the region of the two inductors 20 and 20' and between which the sheet metal layer 24 can be arranged.

Due to the pressure pad 36 in the device in accordance with FIG. 5, it is possible at least to a very large extent to prevent the sheet metal layer 24 from forming bulges or folds when it is being heated up by the induction unit 30—the formation of these bulges or folds being prevented due to the fact that the sheet metal layer 24 is being pressed downwardly against the support means 28 at least in the region of the inductor 20 and is clamped between this support means and the intermediate plate 34.

Since the sheet metal layer is to be formed in the region thereof that is of lesser hardness due to the inductive heating process, it can be advantageous to provide this region that is to be heated with a deformation prior to the inductive heating process, the effect thereof on the one hand being that thermal expansions of the sheet metal layer taking place in the course of the inductive heating process will lead to a deformation of the sheet metal layer in a given direction and on the other hand, it can serve to facilitate the forming process which follows on after the inductive heating process. This will now be described in more detail with the help of FIG. 6.

FIG. 6 shows an embodiment of the device in accordance with the invention which has been slightly modified vis a vis the embodiment in accordance with FIG. 5, but namely only in as much as the intermediate plate 34 of the embodiment in accordance with FIG. 5 has been omitted and the shape of the inductor 20, i.e. the shape of the lower surface thereof is matched to the geometry of a deformation of the sheet metal layer 24 which had already been produced in the sheet metal layer prior to the inductive heating thereof. In the case of the embodiment illustrated in FIG. 6, this deformation of the sheet metal layer 24 takes the form of a beading 40, and the lower surface of the inductor 20 is shaped accordingly. In the device in accordance with FIG. 6, the part of the sheet metal layer 24 outside the beading 40 is intended to be clamped between the pressure pad 36 and the support means 28, while the region of the sheet metal layer that is to be subsequently formed is inductively heated. As a consequence of the beading 40, thermal expansions of the sheet metal layer occurring during the inductive heating of the sheet metal layer 24 lead to a defined deformation of the sheet metal layer underneath the inductor 20, namely, to an increase in the height of the beading 40. Naturally, the distance of the upper surface of the sheet metal layer 24 from the lower surface of the inductor 20 must be selected in such a way that no contact between the latter and the inductor 20 will take place in the course of the inductive heating of the sheet metal layer 24.

Now the beading 40 also facilitates any flanging or folding back of the right-hand end region of the sheet metal layer 24 in accordance with FIG. 6 that may possibly be required, if the flanging is to be done in such a way that the bending radius of the flanged region (see FIG. 2) is located in that position where the summit or the crest of the beading 40 was before the flanging process.

A preferred embodiment of the method in accordance with the invention will now be described in more detail with the aid of FIGS. 7A to 7D.

Figure 7A:
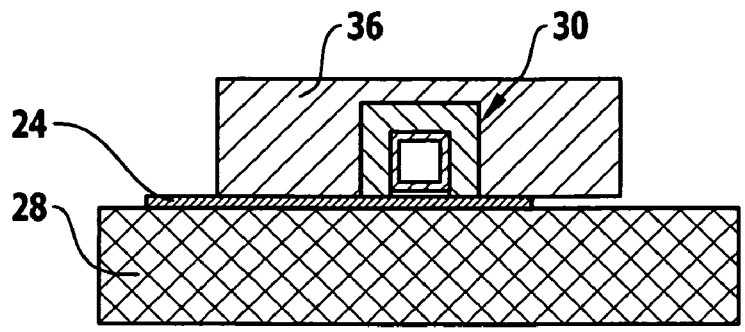

FIG. 7A shows a device similar to that in accordance with FIG. 3, whereby however, the induction unit 30 is inserted into a pressure pad 36 as was the case for the embodiment in accordance with FIG. 5. An intermediate plate corresponding to the intermediate plate 34 of the embodiment in accordance with FIG. 5 can be utilised in place of the air gap shown in FIG. 7A.

After the region of the sheet metal layer 24 that is to be subsequently formed has been inductively heated, something which can lead to a change in the geometry of a neighbouring edge of the sheet metal layer, the geometry of an opening that is to be surrounded by a stopper for example, a region of the sheet metal layer neighbouring the inductively heated region of the sheet metal layer 24 is provided with a border or an edge of a given geometry by means of a stamping process, namely in a stamping device such as has been schematically illustrated in FIG. 7B. This stamping device has a partially illustrated bottom die 42, a partially illustrated male mould in the form of a punch 44 and also a partially illustrated pressure pad 46 for clamping the sheet metal layer 24 between itself and the bottom die 42.

Figure 7B:
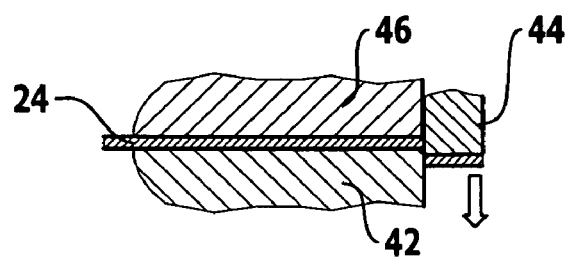
Figure 7C:
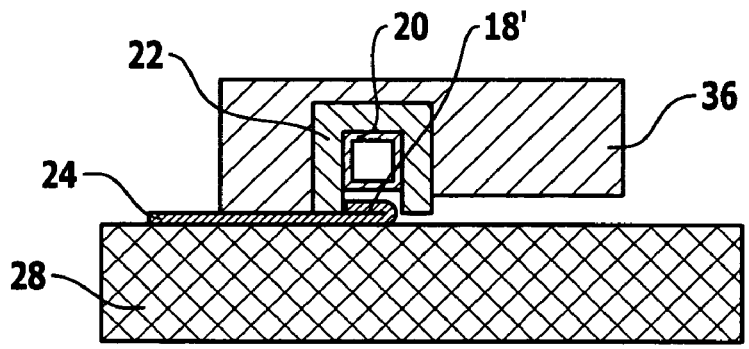

After the stamping operation, the right-hand boundary region of the sheet metal layer 24 in accordance with FIG. 7B for example is formed by a flanging process by means of a not illustrated tool (see FIG. 2) so that the sheet metal layer 24 is then shaped as shown in FIG. 7C. In this way, the stopper 18' shown in FIG. 2 can be produced on the sheet metal layer 24. If now the stopper is to be provided with a profile, to be of varying height or thickness along the stopper (perpendicular to the plane of the drawing in FIG. 7C) for example, it is advisable to inductively heat the sheet metal layer 24 in the region of the stopper 18' once again in order to facilitate the forming process (an embossing process) that is necessary for producing the elevational profile. The device which is shown schematically in FIG. 7C and comprises a support means 28 for the sheet metal layer 24, an inductor 20, a concentrator 22 and a pressure pad 36 serves for this purpose.

Figure 7D:
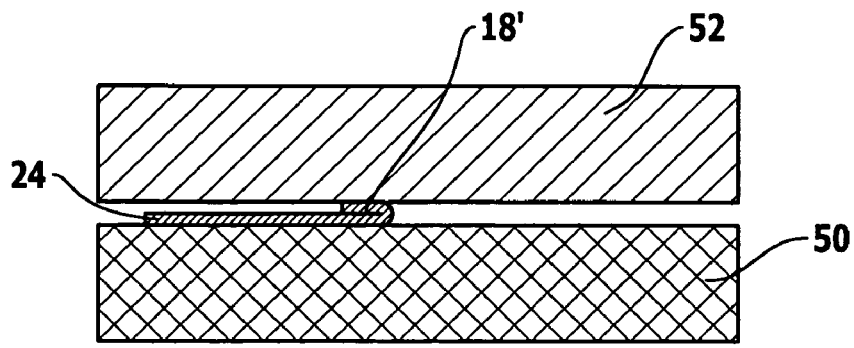

Finally, FIG. 7D schematically shows a press or an embossing device incorporating two stamps 50 and 52 with which the desired profile can be imposed on the stopper 18'.

Thus, something that is also to be regarded as falling under the present invention is the case where a device in accordance with the invention does not serve to inductively heat up a region that is to be subjected to a forming process in a sheet metal layer consisting of spring steel so as to enable such a spring-steel sheet metal layer to be provided with a supporting element in the form of a stopper for example, but wherein the device in accordance with the invention is designed and used in such a way that the hardness of a previously manufactured supporting element can be changed (decreased) therewith.

Since the magnetic field concentrator of a device in accordance with the invention possibly contains electrically conducting particles as mentioned above, it can be expedient to provide an electrically insulating layer between a concentrator 22 and an inductor 20; likewise it can be expedient to provide an electrically insulating layer which is an integral component of the induction unit 30 between the inductor 20 and the sheet metal layer that is to be inductively heated. FIG. 8 shows such a variant and in accordance therewith, the inductor 20 is surrounded by an electrically insulating layer 54 in the manner of a cladding.

On the basis of FIGS. 9 and 10, there will now be described a spring-steel sheet metal layer of a gasket which, with the help of the method in accordance with the invention, has been provided with a supporting element that is not associated with a sealing beading, but rather, is intended to counteract surface distortions in the components of a machine between which the gasket is to be mounted. FIG. 9 shows a part of a sheet metal layer 60 comprising a fluid opening 62 around which the sheet metal layer 60 is provided with a sealing beading 64. Furthermore, the sheet metal layer 60 incorporates screw holes 66 through which mounting bolts, cylinder head bolts for example, can pass. At the periphery of the sheet metal layer 60, there are sheet metal tabs 68 which were produced by stamping them out from the sheet metal layer 60, the intention being that these tabs should be folded back onto said layer in such a way as to form supporting elements 68' which have also been illustrated in FIG. 9. FIG. 10 shows a section along the line 10-10 in FIG. 9, and depicts both the sheet metal tabs 68 that have not yet been folded back, and also the supporting elements 68'. Thus, prior to the process of folding back the sheet metal tabs 68, regions of the sheet metal layer 60, in which the bending radii of the sheet metal layer will be located after the process of folding back the sheet metal tabs 68 has been effected, are heated up inductively in accordance with the invention.

FIG. 11 shows an embodiment of a device in accordance with the invention with which boundary regions of a plurality of sheet metal layers 24 that are stacked one upon the other can be heated up inductively at the same time in accordance with the invention. Hereby, as is shown in FIG. 11, the sheet metal layers 24 are held between retaining cheeks 70 and 72 so that the right-hand boundary regions of the sheet metal layers 24 in accordance with FIG. 11 can be heated up inductively at the same time using an induction unit 30 in accordance with the invention which consists of an inductor 20 and a concentrator 22.

In order not to have to adapt the device in accordance with the invention to the shape of the boundary regions of the sheet metal layers 24 (in a plan view of the sheet metal layers stacked one upon the other), the sections of these boundary regions following one another in the longitudinal direction of these boundary regions of the sheet metal layers 24 could also be successively heated up inductively with the help of the induction unit 30, in that, in accordance with the invention, the induction unit 30 illustrated in FIG. 11 is moved along the boundary regions of the stacked sheet metal layers 24 and/or the boundary regions of the sheet metal layers 24 stacked one on top of the other are moved past the induction unit 30.

A further embodiment of the method in accordance with the invention and a device in accordance with the invention suitable for the implementation thereof will now be described with the aid of FIGS. 12 and 13, these being intended to subject a sheet metal layer of spring steel to tensile stress that is effective in the sheet metal layer during the heating of the region therein that is to be formed in order to thereby minimize distortions in the region of the sheet metal layer that is to be inductively heated and possibly also to reduce the thickness of the metal sheet. In similar manner to the device in accordance with FIG. 5, the device illustrated in FIG. 12 has a pressure pad 36, a concentrator 22 and an inductor 20 below which there is a support means 28 for a sheet metal layer 24 so that the latter can be clamped between the pressure pad 36 and the support means 28. By contrast however, although this cannot be perceived from FIG. 12, the concentrator 22 is dimensioned such that the pressure pad 36 protrudes downwardly somewhat beyond the concentrator 22 and as a consequence thereof the part of the sheet metal layer 24 which is located underneath the concentrator 22 and the inductor 20 is free from clamping forces even when the sheet metal layer 24 itself is clamped.

Furthermore, the device illustrated in FIG. 12 has a stamp 80 which serves for pressing the sheet metal layer 24 downwardly at the right-hand side of the support means 28 in accordance with FIG. 12, this action thus deflecting it downwardly somewhat in order to additionally produce tensile stresses in the sheet metal layer (apart from the bending stresses) as has been indicated by the arrow T. This applies, in particular, for the case where the sheet metal layer 24 incorporates an opening which, in accordance with FIG. 12, lies to the right of the part of the sheet metal layer 24 illustrated in FIG. 12 and around which a circular ring-like region of the sheet metal layer is to be inductively heated—the pressure pad 36, the concentrator 22 and the inductor 20 then likewise having a ring-like shape as do the support means 28 and the stamp 80.

A yoke 82 which may likewise have a ring-like shape is located above the pressure pad 36 and the stamp 80; compressive forces can be exerted on the pressure pad 36 and the stamp 80 by means of the compression springs 84 and 86 by lowering the yoke 82. If necessary, a stop means 88 could also be provided below the stamp 80 in order to limit the downward extent of the deflection of the sheet metal layer 24 caused by the stamp 80.

During the inductive heating of the region of the sheet metal layer 24 lying underneath the inductor 20, the tensile stresses produced by the stamp 80 in the sheet metal layer 24 will prevent thermal expansions of the sheet metal layer 24 from producing distortions of the sheet metal layer in the region being inductively heated and possibly too, in the regions of the sheet metal layer 24 directly adjacent thereto. Moreover, as indicated in FIG. 12, the method can also be carried out in such a way that the thickness of the metal sheet is somewhat reduced as a consequence of the tensile stresses produced in the sheet metal layer.

In FIG. 12, the dimensional relationships of the regions of the sheet metal layer 24 depicted therein are illustrated in an exaggerated manner, this being apparent from FIG. 13 which shows a section through a part of the sheet metal layer 24 after the right-hand boundary region of the sheet metal layer 24 in accordance with FIG. 12 has been folded back in order to form a stopper 18' (see FIG. 2). As a consequence of the previously described reduction in the thickness of the metal sheet, the total thickness of the stopper 18' is less than double the thickness of the original sheet metal layer 24.

In the embodiment illustrated in FIG. 14, an induction unit 30' is designed in such a way that a boundary region 18" of a sheet metal layer 24 that is to be formed therewith can be heated up inductively not only in the region where the bending radius will subsequently be found, but also, in accordance with the invention, over the entire boundary region 18" together with the transition thereof into the actual sheet metal layer 24. For this purpose, the width or height i.e. a vertical dimension in accordance with FIG. 14 of the inductor 20' of the induction unit 30' combined with a concentrator 22' is the same as or somewhat greater than the width (the height in FIG. 14) of the boundary region 18" of the sheet metal layer 24. Such an embodiment conveys therewith the advantage that when producing a stopper (such as the stopper 18' in accordance with FIG. 2) or some other supporting element, the boundary region 18" can be bent more easily not only in the region of its root, but that, in the course of the process of folding the boundary region 18" onto the sheet metal layer 24, no cracks or folds will develop in the metal sheet at the free edge (or in the neighbourhood thereof) of the boundary region 18", if, in a plan view of the sheet metal layer 24, the boundary region 18" does not form a straight-line boundary region after the folding process, but, for example, surrounds an opening in the layer of the gasket formed by the sheet metal layer in circular ring-like manner or is located at some other position of the sealing layer whereat the latter has (in a plan view) a convexly curved edge contour.

Finally, a further embodiment of the device in accordance with the invention is illustrated in FIG. 15 with the aid of which it is intended to demonstrate how, in the course of a continuous process, a boundary region of a sheet metal layer that is to be formed can be heated up inductively in accordance with the invention for the purposes of this forming process and then, once heated, can be immediately formed, whereby only one example of a forming process is shown in FIG. 15, namely, the folding of the boundary region onto the actual sheet metal layer.

In the embodiment of the device in accordance with the invention illustrated in FIG. 15, an induction unit comprises an inductor 120 and a concentrator 122 for concentrating the electromagnetic alternating field generated by the inductor onto the region of a sheet metal layer 124 that is to be heated up and formed, whereby, only one part, namely, the region that is to be heated up, has been illustrated and this to only a partial extent.

Here, the inductor 120 has the shape of an electrical conductor that has been made into the form of a loop, whereby only two longitudinal sections of the two arms of this electrical conductor run within the concentrator 122 so that it is only there that the electromagnetic alternating field is concentrated onto the sheet metal layer 124—the sections of the inductor 120 running outside the concentrator 122 therefore have no noticeable consequential heating effect on those regions of the sheet metal layer 124 which lie below (but have not been illustrated) that portion of the inductor 120 which runs outside the concentrator 122. Just for the sake of completeness, it should be mentioned that the electrical alternating current flowing through the inductor 120 is fed into those ends of the two arms of the inductor which are not shown in FIG. 15 since they are located at the left-hand end of the concentrator 122 in accordance with FIG. 15 and are intended to be accessible from there.

In the device illustrated in FIG. 15, the induction unit comprising the inductor 120 and the concentrator 122 is intended to be moved in the direction of the arrow F and thereby sweep over and inductively heat a boundary region of the sheet metal layer 124 shown in FIG. 15. A tool 190 is also moved in the direction of the arrow F together with this induction unit, whereby the tool 190 directly adjoins the concentrator 122 and can be united with the induction unit so as to form a modular unit. As is shown in FIG. 15, the tool 190 is designed in such a way that the boundary region of the sheet metal layer 124 that has been heated up by the induction unit 120, 122 is continuously arched out and then, such as is depicted for the stopper 18' in FIG. 2, it is folded over onto the actual sheet metal layer 124 by a not illustrated appropriately designed portion of the tool 190.

The invention claimed is:

1. A method for producing at least one supporting element in at least one first region of a sheet metal layer of a gasket to be mounted between machine components having sealing surfaces between which said gasket is to be clamped, wherein said at least one supporting element is adapted to receive compressive forces acting on the gasket when the gasket is clamped between said sealing surfaces, said sheet metal layer being made of a spring steel having a starting hardness and including a another region, adjacent to said at least one first region, where a spring resilient element is or is to be provided, said method comprising the steps of:
   (a) selectively reducing said starting hardness of the spring steel of said sheet metal layer in said at least one first region by inductive heating said at least one first region, said inductive heating involving selectively exposing said at least one first region of said sheet metal layer in its entirety for a time of at most two seconds to an alternating electromagnetic field that is concentrated on said at least one first region, and
   (b) producing said at least one supporting element by subjecting the sheet metal layer in said at least one first region to plastic working to provide a total thickness of the sheet metal layer at the at least one supporting element that is greater than the total thickness of the sheet metal layer between said at least one supporting element and said another region.

2. A method in accordance with claim 1, including simultaneously exposing all parts of said at least one first region of the sheet metal layer to the electromagnetic alternating field.

3. A method in accordance with claim 1, wherein the spring steel of the sheet metal layer has a starting yield strength $R_e$ of at least 1000 N/mm$^2$.

4. A method in accordance with claim 1, wherein the spring steel having said starting hardness comprises an austenitic spring steel.

5. A method in accordance with claim 1, wherein said at least one first region of the sheet metal layer is heated to at least approximately 700° C.

6. A method in accordance with claim 5, wherein said at least one first region of the sheet metal layer is heated to a temperature of approximately 700° C. to approximately 900° C.

7. A method in accordance with claim 1, wherein said at least one first region of the sheet metal layer is exposed to the electromagnetic alternating field for a time of at least milliseconds.

8. A method in accordance with claim 1, wherein said at least one first region of the sheet metal layer is exposed to the electromagnetic alternating field for a time of approximately 10 milliseconds to approximately 1 second.

9. A method in accordance with claim 1, including inductively heating said at least one first region of the sheet metal layer by exposure for such a time and at such a concentration and energy of the electromagnetic alternating field that at least no significant amount of recrystallisation of the steel occurs in said at least one first region.

10. A method in accordance with claim 1, wherein a frequency of the electromagnetic alternating field is in the range of hundreds of kHz to approximately 1 MHz.

11. A method in accordance with claim 1, wherein an energy of the electromagnetic alternating field is at least approximately 1 kW.

12. A method in accordance with claim 1, wherein, after heating, said at least one first region of the sheet metal layer that is plastically worked is cooled down at a sufficiently rapid rate as to prevent embrittlement of the steel which embrittlement could impair the ductility of the sheet metal layer.

13. A method in accordance with claim 1, including clamping the sheet metal layer between clamping surfaces during the heating of said at least one first region of the sheet metal layer for preventing warpages of the sheet metal layer.

14. A method in accordance with claim 1, including subjecting the sheet metal layer to tensile stress during the heating of said at least one first region of the sheet metal layer.

15. A method in accordance with claim 1, wherein the inductive heating of said at least one first region of the sheet metal layer that is to be plastically worked to provide the supporting element is conducted by exposure to the electromagnetic alternating field for such a time and at such a concentration and energy of the electromagnetic alternating field that at least no significant structural change of the spring steel occurs within said another region of the sheet metal layer that is provided with or is to be provided with said spring resilient element.

16. A method in accordance with claim 15, wherein the spring resilient element is at least one spring resilient sealing bead for which the supporting element forms a deformation limiter.

17. A device for carrying out the method in accordance with claim 1, wherein said device comprises at least one electrical conductor forming an inductor that is connectable to an a.c. source for inductively heating the at least one first region of the sheet metal layer, and a magnetic field concentrating device partially surrounding the inductor and forming an induction unit together with the inductor, said magnetic field concentrating device comprising an opening to face towards the at least one first region of the sheet metal layer, and wherein the magnetic field concentrating device is permeable to the electromagnetic alternating field in a region of said opening.

18. A device in accordance with claim 17, wherein the induction unit has a shape that is matched to the shape of the at least one first region of the sheet metal layer.

19. A device in accordance with claim 17, wherein the induction unit and the sheet metal Layer are movable relative to one another in such a manner that the at least one first region of the sheet metal layer can be passed over by the induction unit.

20. A device in accordance with claim 17, including first and second induction units having respective magnetic field concentrating devices with mutually opposed openings between which the sheet metal layer can be placed.

21. A device in accordance with claim 17, including a clamping device associated with the induction unit for clamping the sheet metal layer at least in proximity to the at least one first region of the sheet metal layer that is to be heated up inductively.

22. A device in accordance with claim 17, including a spacer consisting of a material which is permeable to the electromagnetic alternating field and is arranged between the at least one first region of the sheet metal layer that is to be inductively heated and the inductor.

* * * * *

UNITED STATES PATENT AND TRADEMARK OFFICE
CERTIFICATE OF CORRECTION

PATENT NO. : 8,336,359 B2
APPLICATION NO. : 12/381389
DATED : December 25, 2012
INVENTOR(S) : Ulrich Werz It is certified that error appears in the above-identified patent and that said Letters Patent is hereby corrected as shown below:

Column 16, Claim 19, line 58, replace --Layer-- with --layer--.

Signed and Sealed this
Twelfth Day of March, 2013

Teresa Stanek Rea
*Acting Director of the United States Patent and Trademark Office*